(12) United States Patent
Huang et al.

(10) Patent No.: US 7,782,853 B2
(45) Date of Patent: Aug. 24, 2010

(54) APPARATUS AND METHOD OF USING FULLY CONFIGURABLE MEMORY, MULTI-STAGE PIPELINE LOGIC AND AN EMBEDDED PROCESSOR TO IMPLEMENT MULTI-BIT TRIE ALGORITHMIC NETWORK SEARCH ENGINE

(75) Inventors: Lun Bin Huang, San Diego, CA (US); Suresh Rajgopal, San Diego, CA (US); Nicholas Julian Richardson, San Diego, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 2096 days.

(21) Appl. No.: 10/313,174

(22) Filed: Dec. 6, 2002

(65) Prior Publication Data

US 2004/0109451 A1 Jun. 10, 2004

(51) Int. Cl.
*H04L 12/28* (2006.01)
*G06F 7/00* (2006.01)
*G06F 9/26* (2006.01)

(52) U.S. Cl. ............... 370/392; 370/389; 370/401; 707/705; 711/216

(58) Field of Classification Search ......... 370/363–415; 707/100–200, 3, 4, 705–707; 709/208–245; 711/108–217
See application file for complete search history.

(56) References Cited

U.S. PATENT DOCUMENTS

| | | | | |
|---|---|---|---|---|
| 5,781,772 A * | 7/1998 | Wilkinson et al. | ............. | 707/3 |
| 5,857,196 A * | 1/1999 | Angle et al. | ................ | 707/102 |
| 6,067,574 A * | 5/2000 | Tzeng | ........................ | 709/247 |
| 6,178,135 B1 * | 1/2001 | Kang | .................... | 365/230.03 |
| 6,212,184 B1 * | 4/2001 | Venkatachary et al. | ...... | 370/392 |
| 6,275,927 B2 * | 8/2001 | Roberts | ....................... | 712/213 |
| 6,430,527 B1 * | 8/2002 | Waters et al. | .................. | 703/3 |
| 6,560,610 B1 * | 5/2003 | Eatherton et al. | ........ | 707/104.1 |
| 6,581,106 B1 * | 6/2003 | Crescenzi et al. | ........... | 709/242 |
| 6,614,789 B1 * | 9/2003 | Yazdani et al. | .............. | 370/392 |

(Continued)

FOREIGN PATENT DOCUMENTS

WO WO 01/63852 A1 8/2001

OTHER PUBLICATIONS

Andreas Moestedt et al., "IP Address Lookup in Hardware for High-Speed Routing," IEEE Hot Interconnects VI, Aug. 1998, pp. 31-39.

(Continued)

*Primary Examiner*—Man Phan
(74) *Attorney, Agent, or Firm*—Lisa K. Jorgenson; William A. Munck

(57) ABSTRACT

A multi-bit trie network search engine is implemented by a number of pipeline logic units corresponding to the number of longest-prefix strides and a set of memory blocks for holding prefix tables. Each pipeline logic unit is limited to one memory access, and the termination point within the pipeline logic unit chain is variable to handle different length prefixes. The memory blocks are coupled to the pipeline logic units with a meshed crossbar and form a set of virtual memory banks, where memory blocks within any given physical memory bank may be allocated to a virtual memory bank for any particular pipeline logic unit. An embedded programmable processor manages route insertion and deletion in the prefix tables, together with configuration of the virtual memory banks.

22 Claims, 5 Drawing Sheets

U.S. PATENT DOCUMENTS

| | | | |
|---|---|---|---|
| 6,625,612 B1 * | 9/2003 | Tal et al. | 707/102 |
| 6,631,419 B1 * | 10/2003 | Greene | 709/238 |
| 6,665,297 B1 * | 12/2003 | Hariguchi et al. | 370/392 |
| 6,691,124 B2 * | 2/2004 | Gupta et al. | 707/101 |
| 6,691,171 B1 * | 2/2004 | Liao | 709/245 |
| 6,691,218 B2 * | 2/2004 | Brown | 711/216 |
| 6,697,363 B1 * | 2/2004 | Carr | 370/389 |
| 6,711,153 B1 * | 3/2004 | Hebb et al. | 370/351 |
| 6,725,326 B1 * | 4/2004 | Patra et al. | 711/108 |
| 6,782,382 B2 * | 8/2004 | Lunteren | 707/3 |
| 6,792,423 B1 * | 9/2004 | Jeffries et al. | 707/6 |
| 6,836,771 B2 * | 12/2004 | Brown | 707/3 |
| 6,859,455 B1 * | 2/2005 | Yazdani et al. | 370/392 |
| 6,880,064 B1 * | 4/2005 | Brown | 711/216 |
| 6,888,838 B1 * | 5/2005 | Ji et al. | 370/401 |
| 6,928,430 B1 * | 8/2005 | Chien et al. | 707/3 |
| 6,934,252 B2 * | 8/2005 | Mehrotra et al. | 370/229 |
| 7,017,021 B2 * | 3/2006 | Gupta et al. | 711/169 |
| 7,058,725 B2 * | 6/2006 | Mathew et al. | 709/238 |
| 7,099,881 B2 * | 8/2006 | Richardson et al. | 707/100 |
| 7,162,481 B2 * | 1/2007 | Richardson et al. | 707/101 |
| 7,299,227 B2 * | 11/2007 | Richardson | 707/6 |
| 2001/0027479 A1 * | 10/2001 | Delaney et al. | 709/216 |
| 2002/0147721 A1 * | 10/2002 | Gupta et al. | 707/100 |
| 2003/0174717 A1 * | 9/2003 | Zabarski et al. | 370/401 |
| 2003/0236968 A1 * | 12/2003 | Basu et al. | 712/225 |
| 2004/0100960 A1 * | 5/2004 | Mehta | 370/392 |
| 2004/0105442 A1 * | 6/2004 | Ko et al. | 370/392 |
| 2004/0107295 A1 * | 6/2004 | Herkersdorf et al. | 709/242 |
| 2004/0111395 A1 * | 6/2004 | Rajgopal et al. | 707/3 |
| 2004/0114587 A1 * | 6/2004 | Huang et al. | 370/389 |
| 2005/0055339 A1 * | 3/2005 | Richardson | 707/3 |
| 2006/0101130 A1 * | 5/2006 | Adams et al. | 709/218 |

OTHER PUBLICATIONS

Miguel A. Ruiz-Sanchez et al., "Survey and Taxonomy of IP Address Lookup Algorithms," IEEE Network, Mar./Apr. 2001, pp. 8-23.

K.J. Christensen et al., "Local area network-Evolving from shared to switched access," IBM Systems Journal, vol. 34, No. 3, 1995, pp. 347-374.

European Search Report dated Dec. 10, 2007 issued in connection with European Patent Application No. EP 03 25 7666.

* cited by examiner

APPARATUS AND METHOD OF USING FULLY CONFIGURABLE MEMORY, MULTI-STAGE PIPELINE LOGIC AND AN EMBEDDED PROCESSOR TO IMPLEMENT MULTI-BIT TRIE ALGORITHMIC NETWORK SEARCH ENGINE

TECHNICAL FIELD OF THE INVENTION

The present invention is directed, in general, to multi-bit trie based network search engines and, more specifically, to improving the performance of multi-bit trie based network search engines.

BACKGROUND OF THE INVENTION

Network routers for packet-based communications protocols such as Internet Protocol (IP) direct incoming information to the next neighbor along a route to the intended destination for the packet. To do this, typically each router along the route must perform address prefix (normally referred to as just "prefix") lookup operations on a prefix table to determine the appropriate next hop address for the destination IP prefix. Such operations are performed by either an embedded network processor or, more commonly, by a separate network search engine. In addition to performing searches on a prefix (routing) table consisting of destination prefixes and the associated next hop information, the network search engine is also typically tasked with maintaining the prefix table (i.e., inserting and deleting prefixes).

Originally the hardware for network search engines employed ternary content addressable memory (TCAM), a type of memory consisting of a bit comparator and two memory elements, one for storing data and the other storing a compare mask. The TCAM compares incoming data with the value stored in the data memory under the control of the mask value, which may be programmed to override the comparison result to "always match" (i.e., "don't care"). In operation, a TCAM-based network search engine functions by storing all prefixes of a routing table in a TCAM array in a specific, prioritized order, with each prefix's associated next hop information stored in a corresponding (linked) location in another memory. During prefix lookup, a key is placed on the comparand (compare operand) bus of the TCAM array and compared against all prefixes in the memory. The array of match results from all comparisons is sent through a priority logic unit to determine the highest priority match, with the winning match used to address the next hop memory from which the corresponding next hop information is read and returned.

More recently, software based network search engines employing a general-purpose processor and a normal memory have been developed. Within such devices, the processor performs prefix searches with a series of memory read and comparison operations. The routing table prefixes and next hop information are typically stored in the memory in data structures built according to one of various software algorithms developed to reduce memory usage in storing the routing table and the number of memory accesses during lookup. For these purposes, a multi-bit trie and the corresponding algorithm are among the data structures and algorithms that achieve the best data compression with a bounded number of memory accesses for search operations.

A trie (from the middle four letters of "retrieve") is a tree-based data structure built to represent binary strings, where each bit in the string determines the direction taken among branches within the tree. A binary (unibit or single bit) trie proceeds bit-by-bit and has at most two branches from each node, while a multi-bit consumes multiple bits at a time and has several branches at each node, each branch leading to the next level. The number of bits consumed during branch selection at each node is referred to as a stride. A uniform width stride trie is a trie with all strides having the same width, except possibly the last stride, which may be the remainder of the prefix length after being divided by the stride width.

Generally, the multi-bit trie algorithm works by storing and retrieving prefixes in a uniform stride width trie, grouping all branches in the same level with the same parent (next higher stride level) stride value into a table, referred to as a trie table. If a prefix of length l is divided into m strides each of n bits, the maximum possible number of entries within the next level trie table is $2^n$. The algorithm encodes all next level stride values from the same parent into a $2^n$ bit data field stored in the entry within the parent trie table, along with a pointer containing the base address of the next level (child) trie table, in a data structure referred to as a trie node. Table compression is achieved by allocating memory for the actual number of table entries that exist, instead of the maximum size $2^n$. For the last stride of each prefix, a similar type of data structure, referred to as an end node, is used, except in this case the pointer points to a table containing next hop information instead of a next level trie table.

Routing table lookup is also performed in same width strides, with the value of the next level stride decoded and processed together with the associated data field in the stride value's parent table entry. If a stored route with the same prefix stride value is determined to exist within the trie, an index is calculated using the information in the parent table, then the search continues using the table pointer and the calculated index to form an address leading to the next level trie table entry. If a match is not found, the search terminates without success. If a search reaches an end node and a match is found, the search is successful and the associated next hop information is read from the next hop table.

Existing and proposed implementations of multi-bit trie network search engines lack the throughput required for high performance networks, and also lack the flexibility required for handling both current and future routing needs, since prefix distributions are dynamic and may not be perfectly predicted.

There is, therefore, a need in the art for an improved multi-bit trie network search engine.

SUMMARY OF THE INVENTION

To address the above-discussed deficiencies of the prior art, it is a primary object of the present invention to provide, for use in a network router, a multi-bit trie network search engine implemented by a number of pipeline logic units corresponding to the number of longest-prefix strides and a set of memory blocks for holding prefix tables. Each pipeline logic unit is limited to one memory access, and the termination point within the pipeline logic unit chain is variable to handle different length prefixes. The memory blocks are coupled to the pipeline logic units with a meshed crossbar and form a set of virtual memory banks, where embedded memory blocks within physical memory may be allocated to a virtual memory bank for any particular pipeline logic unit. An embedded programmable processor manages route insertion and deletion in the prefix tables, together with configuration of the virtual memory banks.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

Figure 1:
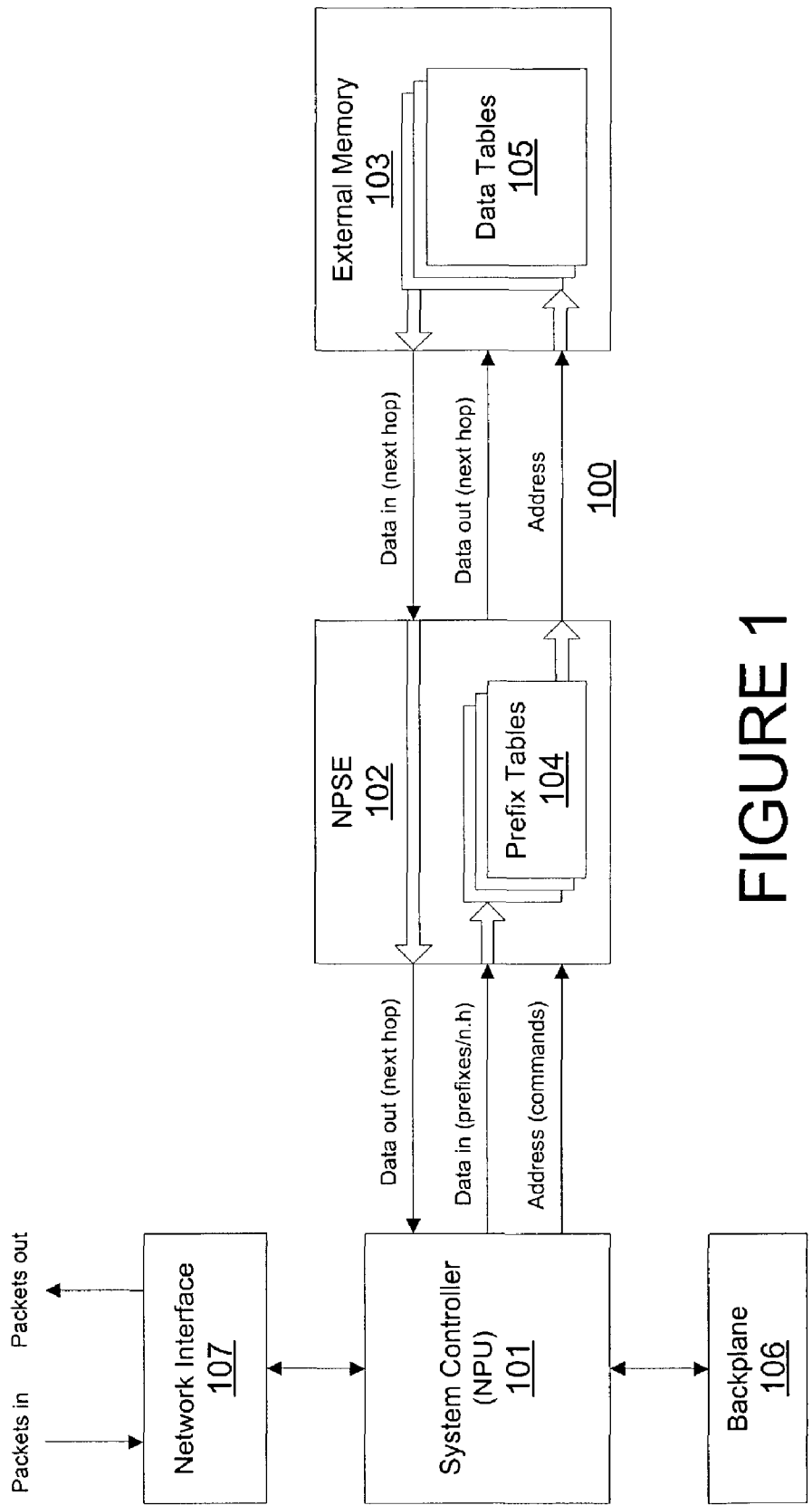
FIG. 1 depicts a processing system utilizing a fully configurable memory, multi-stage pipeline multi-bit trie network search engine according to one embodiment of the present invention.
Figure 2A:
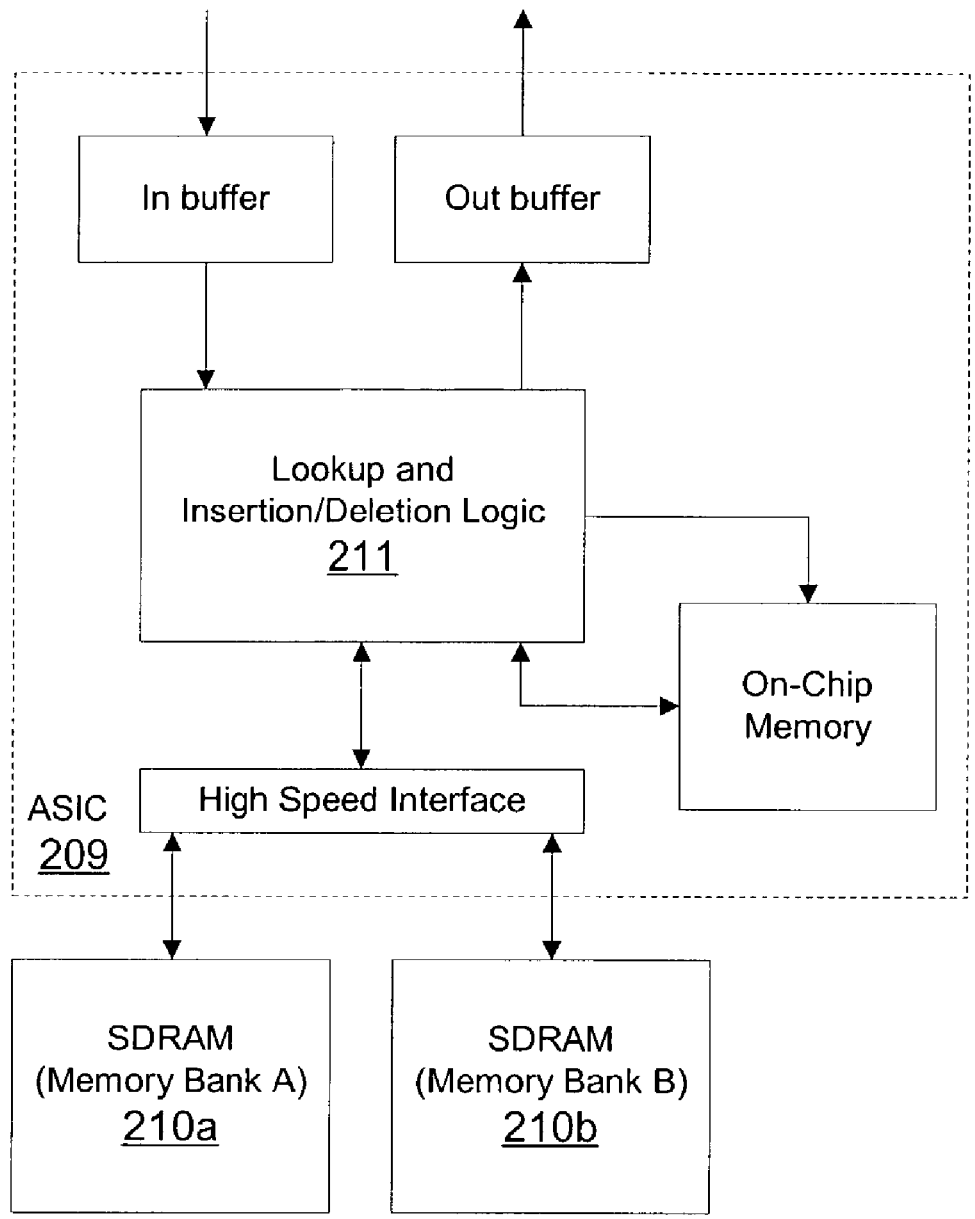
FIGS. 2A through 2C are comparative diagrams of microarchitectures for pipelined multi-bit trie network search engine according to various proposals and according to one embodiment of the present invention.
Figure 2B:
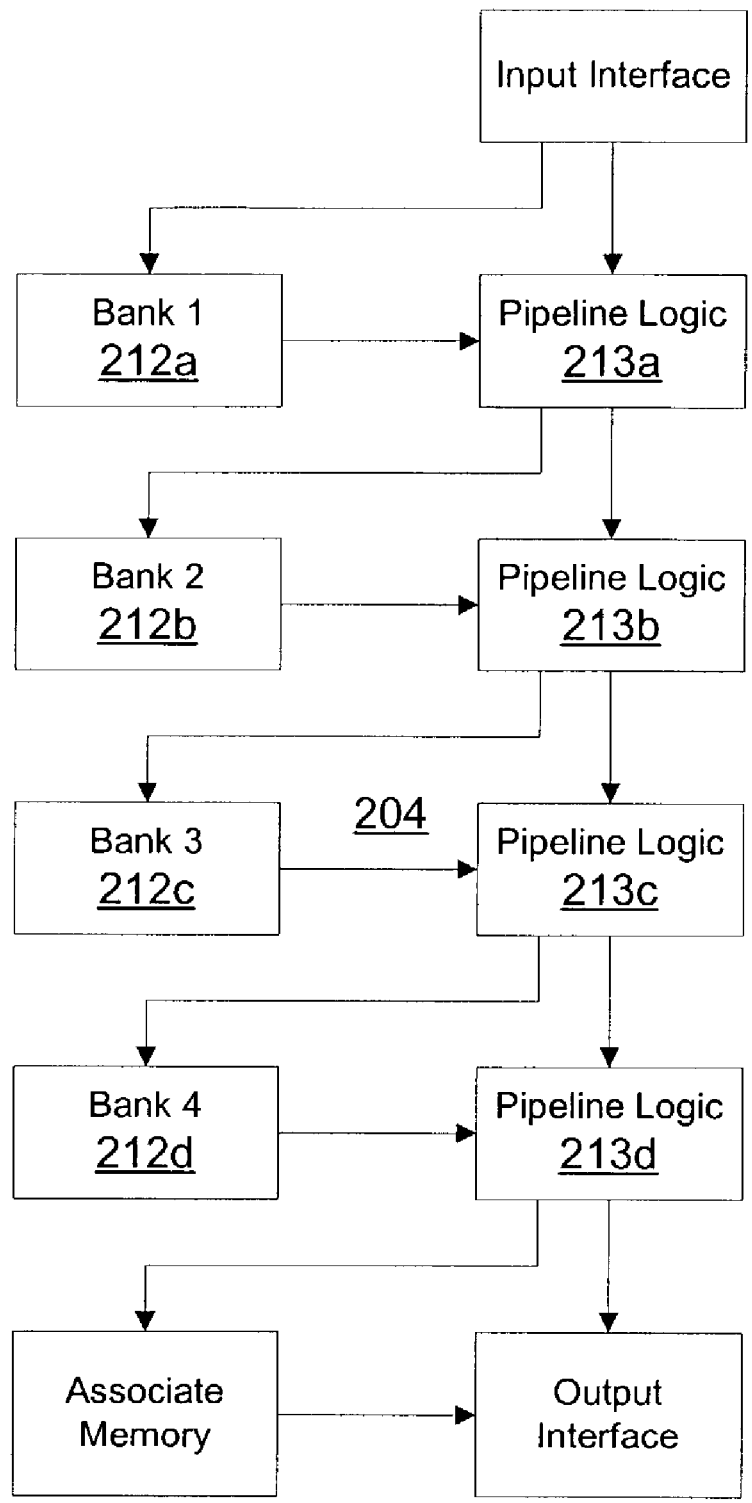
Figure 2C:
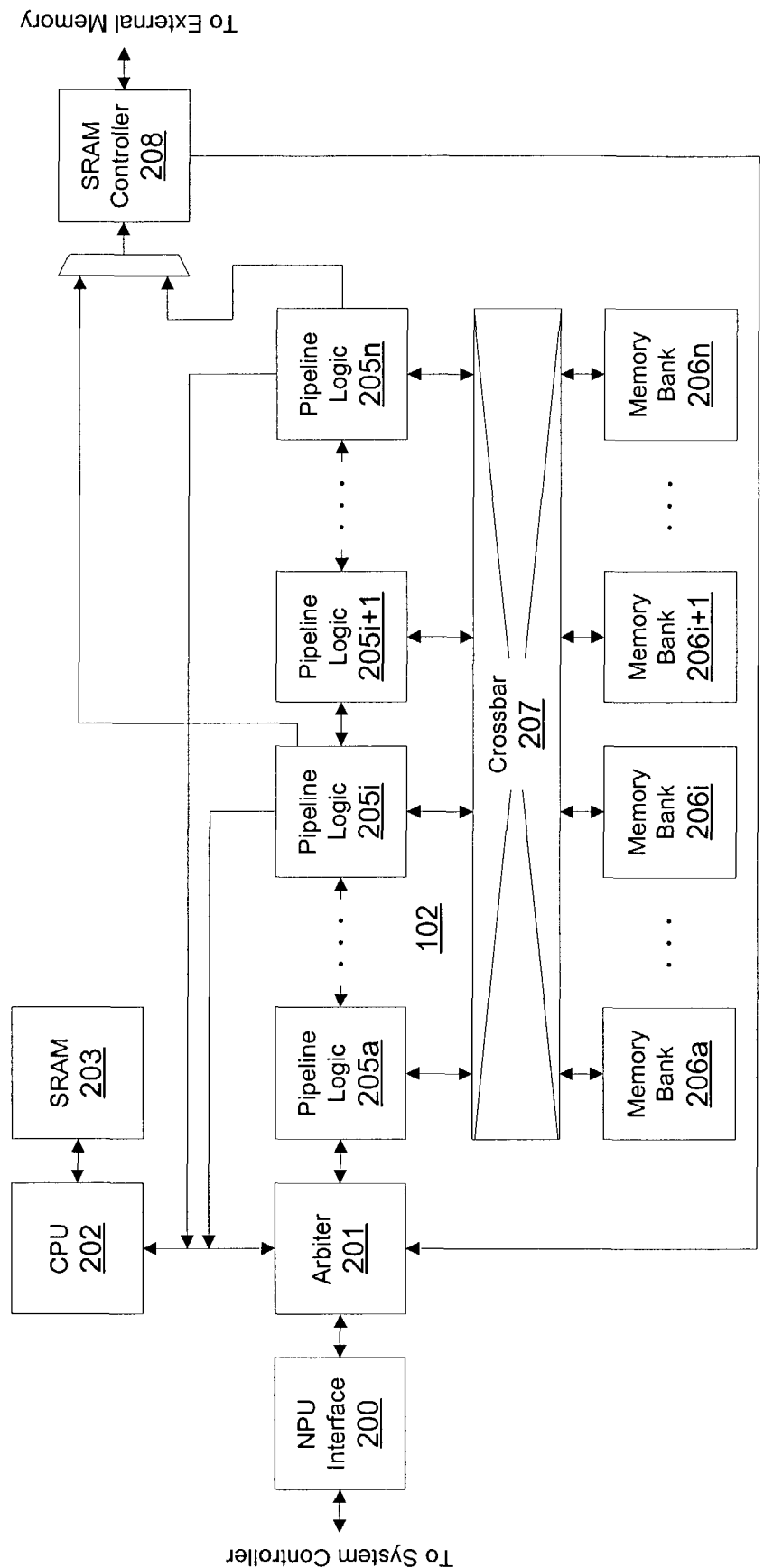
Figure 3:
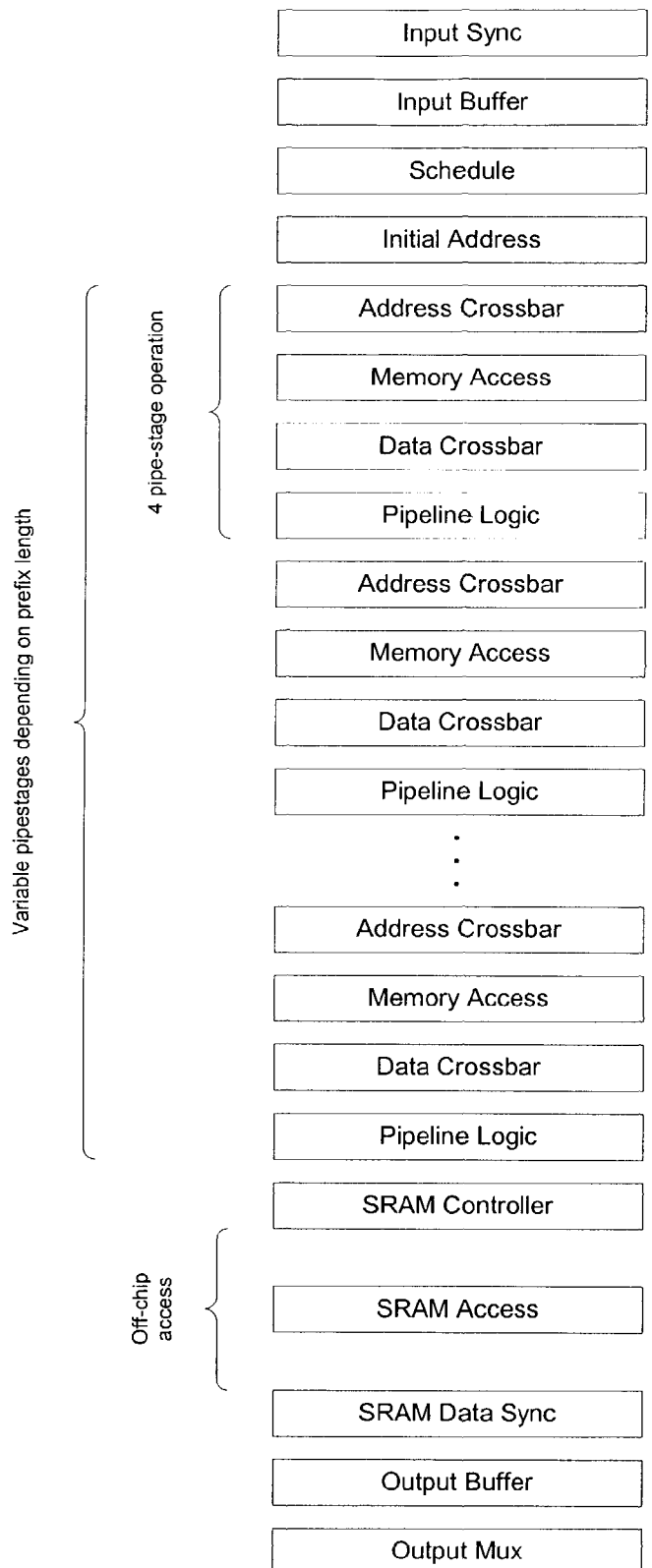
FIG. 3 illustrates the execution pipe-stages for a fully configurable memory, multi-stage pipeline multi-bit trie network search engine according to one embodiment of the present invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device.

FIG. 1 depicts a processing system utilizing a fully configurable memory, multi-stage pipeline multi-bit trie network search engine according to one embodiment of the present invention. Processing system 100 implements a portion of an Internet Protocol (IP) network router and includes a system controller or network processing unit (NPU) 101 coupled to a network packet search engine (NPSE) 102, which in turn is coupled to external memory 103. NPSE 102 receives addresses and/or commands from system controller 101 as well as prefixes for the next hop address, and returns the next hop address to system controller 101. NPSE 102 transmits data table memory addresses to external memory, together with a data pointer to the next hop address within a data table, determined from prefix tables 104, to external memory 103. NPSE 102 receives from external memory 103 the next hop address from the table and entry within data tables 105 identified by the address and data pointer. System controller 101 is coupled to a backplane 106 and through a network interface 107 to a network.

NPSE 102 is preferably coupled to system controller 101 by a high-speed 36-bit network processor unit (NPU) interface and to external memory 103 by a high-speed 36-bit static random access memory (SRAM) interface. Each interface is implemented by a quad data rate (QDR) architecture, with the system controller 101 as the master for the NPU interface and the external memory 103 as the slave for the SRAM interface, providing 36 bit simultaneous data input/output (I/O) at two words per clock with a maximum clock frequency of 250 mega-Hertz (MHz) for peak aggregate bandwidth of 4.5 gigabytes/second (GB/s).

FIGS. 2A through 2C are comparative diagrams of microarchitectures for pipelined multi-bit trie network search engine according to various proposals and according to one embodiment of the present invention. FIG. 2A is one proposed pipelined multi-bit trie network search engine utilizing an application specific integrated circuit (ASIC) 209 and two synchronous dynamic random access memories (SDRAMs) 210a-210b to implement a multi-bit bitmap trie algorithm. In this implementation, prefix strides are divided into two groups and the associated trie tables stored in two memory banks 210a-210b, one for each group. Every prefix search performed by lookup logic 211 involved two pipelined operation to the two memory banks 210a-210b, each of which may be accessed multiple times in each pipeline. Prefix insertions and deletions are also handled by the ASIC logic 211, with help from an on-chip memory.

The implementation of FIG. 2A lacks the throughput required for high performance network search engines. Since the lookup is divided into two pipeline operations, there can be only two concurrent operations every clock cycle. An Internet Protocol version 4 (IPv4) address may have up to 32 prefix bits and a reasonable stride width would be 4 bits, requiring up to 8 memory references to complete a single search. In the worst case, four memory references are required in each pipeline stage to complete a search, with a throughput equal to one-quarter of the maximum bandwidth. In the case of Internet Protocol version 6 (IPv6), where the prefix width is 128 bits, the through put can be many times lower.

FIG. 2B illustrates another proposed implementation of a pipelined tree-based search algorithm referred to as a B-tree, which stores partial prefix values in tree tables and relies on multiple comparators to calculate next table indexes during search. The prefixes are stored in four fixed size memory banks 212a-212d and the table update is performed by pipeline logic 213a-213d. The algorithm employed is quite different from bitmapped multi-bit tries and has different hardware requirements.

Both implementations of FIGS. 2A and 2B lack the flexibility required to cope with current and future routing environments, and the hardware may be too complicated to handle the table update and memory management operations. Committing fixed-sized memory for each bank is a risky approach since memory size requirements for all algorithmic solutions depend heavily on the routing table dataset. The prefix distribution for these datasets change with different routing environments. In a rapidly changing networking environment, the future trend of routing prefix distributions cannot be perfectly predicted. Fixing each bank's size may run the risk of exhausting one memory bank while another bank is sparsely used, impacting search engine capacity under some situations. Furthermore, implementing the entire algorithm in hardware complicates the logic needed to support various functions, including table updates and memory allocations/de-allocations during the updates, which can be quite complicated.

FIG. 2C depicts a fully configurable memory, multi-stage pipeline multi-bit trie network search engine according to one embodiment of the present invention. NPSE 102 includes: an NPU interface 200 coupling the NPSE 102 to the system controller 101; an arbiter 201; a central processor unit (CPU) 202 with associated memory (SRAM) 203 containing the programs executed by CPU 202; an SRAM controller 204 coupling the NPSE 102 to the external memory 103; and an array (sixteen in the exemplary embodiment) of pipeline logic units 205a-205n and a corresponding set of configurable memory blocks 206a-206n forming a series of virtual memory banks (also sixteen in the exemplary embodiment), with pipeline logic units 205a-205n and memory blocks 206a-206n coupled by a meshed crossbar 207 enabling the virtual bank configurations. The major tasks performed by NPSE 102 are route insert, delete and search, which expect NPSE 102 to maintain the routing table by inserting routes into and deleting routes from the internal and external memory, and to perform a route search on the prefixes presented and return the associated next hop information.

FIG. 3 illustrates the execution pipe-stages for a fully configurable memory, multi-stage pipeline multi-bit trie network search engine according to one embodiment of the present invention, and is intended to be read in conjunction with FIG. 2C. NPSE 102 is a variable stage pipelined search engine in which the number of execution stage through which an operation passes depends on the prefix length. This feature enables the search engine to reduce average operation latency, which is important in many routing systems.

The variant in the number of execution pipe-stages for NPSE 102 is the prefix search core, which spans four execution pipe-stages and operates on each memory bank 206a-206n. The prefix search core includes an address crossbar stage in which the address is sent through the crossbar to the designated memory block, a memory access stage, a data crossbar stage in which the prefix data travels back to a pipeline logic unit 205-205n, and finally a data processing (pipeline logic) stage in which the accessed prefix data is examined and a new address is generated for the next memory bank.

For a 32 bit IPv4 prefix with a stride width of 4 bits, the search pipeline requires accesses to eight memory banks, one by each pipeline logic unit 205a-205n. Since each memory access requires four execution pipe-stages, this translates to 32 stages, in addition to other front and back invariant processing stages. For IPv6 prefixes, the search pipeline generally requires 16 memory accesses since typically only 64 of the 128 address prefix bits are relevant in a search. The number of execution pipe-stages required in this case is 64, in addition to other front and back invariant processing cycles.

In the present invention, at least the last pipeline logic unit 205n, corresponding to the largest size prefix handled by NPSE 102 (e.g., 64 bit prefixes for IPv6 packets), and one other pipeline logic unit 205i, corresponding to an intermediate prefix size (e.g., 32 bit prefixes for IPv4 packets), are both adapted to signal arbiter 201 and/or CPU 202 when the pipeline termination point is reached. The result from the appropriate pipeline unit 205i or 205n is employed to access the data tables, which may be accomplished in any of a variety of manners. The exemplary embodiment illustrates use of a multiplexer at the input of SRAM controller 208, although those skilled in the art will recognized that, for example, results from pipeline unit 205i could alternatively be simply passed through the remaining pipeline units 205i+1 through 205n without further processing. A fully variable pipeline of the type described in copending U.S. patent application Ser. No. 10/313,395 entitled "A METHOD TO REDUCE LOOKUP LATENCY IN A PIPELINED HARDWARE IMPLEMENTATION OF A TRIE-BASED LOOKUP ALGORITHM", which is incorporated herein by reference, may also be employed.

In order to solve the dataset dependency of the memory size problem, a scheme to dynamically allocate memory blocks to virtual banks is implemented in the present invention, accomplished by meshed crossbar 207 (i.e., an address crossbar coupled with and correlated to a return data crossbar) and a set of small memory blocks within one or more physical memories that form virtual memory banks 206a-206n (note that the number of memory blocks is much larger than the number of pipeline units 205a-205n, and that all memory blocks may be contained within a single physical memory logically organized as virtual memory banks 206a-206n). The crossbar 207 connects any number of memory blocks from one or more physical memories form n virtual banks 206a-206n that may be accessed by the associated pipeline logic units 205a-205n. The allocation of any memory block to a given virtual bank is accomplished by modifying a configuration and/or control register (not shown) associated with the block, adding greater flexibility to the device as the size of each virtual bank can be dynamically adjusted to suit the prefix distribution for a given routing environment.

While the pipeline logic unit is responsible for prefix searches, embedded CPU 202 performs route insertions and deletions and the associated required memory management. The software running on the CPU 202 optimizes the data structure during each operation, allocates and de-allocates memory blocks to a given virtual bank, manages memory in each block to store the data structures, and manages the memory in external SRAM to store the next hop information, adding flexibility and programmability to the device.

In operation, as a route search command is sent to the MPSE 102, the command and the associated data are synchronized and buffered in the NPU interface unit 200. The command then passes through the arbiter 201 and is scheduled to access the pipeline search core (pipeline units 205a-205n) with the address and other control signals for the initial route table in the first virtual bank. The address passes through the address crossbar and accesses the designated memory block. A read operation is performed and the read data is returned to the first pipeline logic unit 205a through the output data crossbar. The trie entry data is processed and compared with the search key to determine a match condition and to calculate the next level (or bank) address.

The next route table address then passes through the address crossbar and the search process repeats. The search process terminates at any of the pipeline logic units 205a-205n if a mis-match is determined, or if a leaf node (end node) is encountered, which indicates a valid route has been found. The terminated command then passes through the remaining pipeline stages without any memory accesses and processing until a pipeline termination point is reached. For IPv4 searches with 4 bit strides, the termination point is the eighth pipeline logic unit; for IPv6 searches with 4 bit strides, the termination point is at the sixteenth (or last) pipeline logic unit.

If a valid route is found, the address calculated from the last memory access is sent to the SRAM controller 208, which then goes off-chip to access the external next hop memory 103. When the SRAM data is returned, the returned data is synchronized and buffered in the output buffer of the NPU interface unit 200. On the other hand, if no valid route is found, the mis-match result travels through a series of pipeline buffers and also arrives at the NPU interface unit output buffer at the same cycle (relative to search initiation) as that in which the next hop data would have arrived. The search is now complete and waits to be read out by the NPU 101. All search operations are pipelined so that NPSE 102 can perform one search command every cycle to achieve high search throughput.

Route insertion and deletion operations need to access the embedded CPU 202 in the present invention, in addition to the pipeline search core. Similar to a search command, the insertion/deletion command is first scheduled to access the pipeline search core to locate the termination point—i.e., the trie level at which the prefix to be inserted or deleted stops overlapping other (remaining) prefixes within the prefix tables. The termination point may be a miss-match result or a leaf node termination.

Unlike a normal search operation, when the commands reach a search pipeline termination point, the insertion and deletion operations interrupt the embedded CPU 202 and activate software programs to process the insertion and deletion tasks. The table update software (loaded into CPU 202 from SRAM 203) then processes the data passed from the arbiter 201 and pipeline logic units 205a-205n. During a route insertion or deletion operation, a memory block may be allocated or de-allocated depending on individual circumstances. If an additional memory block is allocated to a virtual bank, the CPU 202 issues a configuration register write command to the appropriate pipeline logic unit 205a-205n to modify the configuration of crossbar 207 and/or a memory block configuration register. A series of operations are then issued to the pipeline units 205a-205n to update the routing table data structure in the memory blocks allocated to the virtual banks, and external memory operations are then sent to the SRAM controller 208 to update the external SPAM 103. The insertion or deletion operation is complete after the trie tables and next hop tables are updated. Finally, the operation completion status is sent to a status register in the NPU interface unit 200 which can be read by the NPU 101.

Route insert and delete operations may be pipelined with route search operations, but only one route insert or delete operation may be active within the pipeline at a time to ensure memory coherency.

NPSE 102 solves the lack of throughput, programmability and adaptability problems associated with typical hardware implementations of algorithmic search engines by employing a set of innovative microarchitecture features, including the use of variable pipeline logic, configurable memory banks and associated crossbar, and an embedded CPU for table update and memory management, providing a substantial improvement over existing solutions.

The present invention deals with throughput by finely pipelining the search process. By allowing only one memory access in each pipeline, the maximum throughput that the memory design supports can be achieved. Virtual banks are employed to eliminate the potential for a memory distribution problem created by dataset uncertainty. By dividing the memory into small blocks and dynamically allocating the blocks to any memory bank as required through use of a crossbar, the size of each bank may be tailored to the unique requirements of each dataset, maximizing search engine capacity under all conditions. By employing a programmable processor and associated memory, total programming flexibility for table updates and memory management is enabled. The task of the core hardware is simplified, and design risks reduced, by the approach of the present invention.

Although the present invention has been described in detail, those skilled in the art will understand that various changes, substitutions, variations, enhancements, nuances, gradations, lesser forms, alterations, revisions, improvements and knock-offs of the invention disclosed herein may be made without departing from the spirit and scope of the invention in its broadest form.

What is claimed is:

1. A multi-bit trie search engine comprising:
   a series of pipeline units each configured to process a stride within an address prefix;
   a set of memory blocks that can be configured as a plurality of virtual memory banks, each virtual memory bank associated with one of the pipeline units and configured to hold prefix tables for the stride processed by the corresponding pipeline unit;
   a configurable interconnect configured to selectively couple any of the pipeline units to memory blocks allocated to the associated virtual memory bank; and
   a programmable processor configured to control configuration of the virtual memory banks based on prefix distribution within a routing table dataset,
   wherein the series of pipeline units are configured to process route searches without involvement by the programmable processor but route insertions and deletions to the prefix tables by employing the programmable processor together with at least a portion of the series of pipeline units.

2. The multi-bit trie search engine according to claim 1, wherein the configurable interconnect comprises a meshed crossbar.

3. The multi-bit trie search engine according to claim 1, wherein each pipeline unit is configured to be limited to one memory access of the virtual memory banks during a prefix search.

4. The multi-bit trie search engine according to claim 1, wherein a termination point within the series of pipeline units for prefix searches is configured to vary based upon a prefix length.

5. The multi-bit trie search engine according to claim 1, further comprising:
   a programmable controller configured to control allocation of the memory blocks to the virtual memory banks.

6. The multi-bit trie search engine according to claim 5, wherein the memory blocks are allocated based upon prefix distributions within prefix tables for the multi-bit trie.

7. The multi-bit trie search engine according to claim 1, wherein the search engine is configured to be implemented within a network router and is configured to be coupled to a network processor unit and an external memory holding next hop information corresponding to address prefixes within the prefix tables.

8. A multi-bit trie search engine comprising:
   a series of pipeline units configured to collectively process an address prefix for a route search to determine a match to a value within an entry for a routing table;

a plurality of virtual memory banks each coupled to and associated with one of the pipeline units, the virtual memory banks formed from a set of memory blocks that can be configured as the plurality of virtual memory banks within at least one physical memory bank, the virtual memory banks configured to collectively hold prefix tables for a multi-bit trie storing the routing table, each virtual memory bank configured to hold prefix tables for the stride processed by the corresponding pipeline unit;

a configurable interconnect configured to selectively couple any of the pipeline units to memory blocks allocated to the associated virtual memory bank; and a programmable controller configured to control configuration of the virtual memory banks, including allocation of memory blocks within the at least one physical memory bank to each of the virtual memory banks based upon prefix distributions within a routing table dataset including prefix tables for the multi-bit trie, wherein the series of pipeline units are configured to process route searches without involvement by the programmable controller but route insertions and deletions to the prefix tables by employing the programmable controller together with at least a portion of the series of pipeline units.

9. The multi-bit trie search engine according to claim 8, further comprising:
a crossbar configured to couple each pipeline unit to an associated virtual memory bank, wherein each pipeline unit is configured to process a stride within a prefix during route searches and the associated virtual memory bank is configured to hold prefix tables for the stride processed by the corresponding pipeline unit.

10. The multi-bit trie search engine according to claim 8, wherein programmable controller comprises a general purpose processor and associated memory, the series of pipeline units configured to automatically process route searches without involvement by the processor and the processor configured to contribute to processing of route insertions and deletions within the routing table.

11. The multi-bit trie search engine according to claim 8, wherein the series of pipeline units includes at least two termination points for terminating processing of an address prefix after having processed one of at least two different numbers of strides.

12. A method of operating a multi-bit trie search engine comprising:
processing each stride within an address prefix within one of a series of pipeline units;
during processing of a stride, employing one of a plurality of virtual memory banks formed from a plurality of memory blocks that can be configured as the plurality of virtual memory banks, each virtual memory bank associated with one of the pipeline units and holding prefix tables for the stride processed by the corresponding pipeline unit;
selectively coupling any of the pipeline units to memory blocks allocated to the associated virtual memory bank using a configurable interconnect;
controlling configuration of the virtual memory banks based on prefix distribution within a routing table dataset using a programmable processor; and
processing route searches in the series of pipeline units without involvement by the programmable processor, but employing the programmable processor together with at least a portion of the series of pipeline units for processing route insertions and deletions to the prefix tables.

13. The method according to claim 12, wherein the configurable interconnect comprises a meshed crossbar.

14. The method according to claim 12, further comprising:
limiting each pipeline unit to one memory access of the virtual memory banks during a prefix search.

15. The method according to claim 12, further comprising:
varying a termination point within the series of pipeline units for prefix searches based upon a prefix length.

16. The method according to claim 12, further comprising:
controlling allocation of the memory blocks to the virtual memory banks using the programmable processor.

17. The method according to claim 15,
wherein the memory blocks are allocated based upon prefix distributions within prefix tables for the multi-bit trie.

18. The method according to claim 12, further comprising:
operating a network router comprising the multi-bit trie search engine coupled to a network processor unit and an external memory holding next hop information corresponding to address prefixes within the prefix tables.

19. A method of operating a multi-bit trie search engine comprising:
processing an address prefix for a route search collectively within a series of pipeline units to determine a match to a value within an entry for a routing table;
coupling each of a plurality of virtual memory banks to an associated one of the pipeline units, the virtual memory banks formed from memory blocks within at least one physical memory bank and collectively holding prefix tables for a multi-bit trie storing the routing table;
dynamically controlling allocation of memory blocks within the at least one physical memory bank to each of the virtual memory banks based upon prefix distribution within tables for the multi-bit trie;
employing a general purpose processor and associated memory to dynamically control allocation of memory blocks to each of the virtual memory banks;
automatically processing route searches within the series of pipeline units without involvement by the processor; and
employing the processor during processing of route insertions and deletions within the routing table.

20. The method according to claim 19, further comprising:
employing a crossbar to couple each pipeline unit to an associated virtual memory bank;
employing each pipeline unit to process a stride within a prefix during route searches; and
storing, within the virtual memory bank associated with a pipeline unit, prefix tables for the stride processed by the corresponding pipeline unit.

21. The method according to claim 19, further comprising:
operating a network router comprising the multi-bit trie search engine coupled to a network processor unit and an external memory holding next hop information corresponding to address prefixes within the prefix tables.

22. The method according to claim 19, further comprising:
terminating processing of an address prefix at one of at least two termination points within the series of pipeline units after having processed one of at least two different numbers of strides.

* * * * *